J. KNIGHT.
VEHICLE DEVICE FOR CHECKING HORSES.
No. 170,091. Patented Nov. 16, 1875.
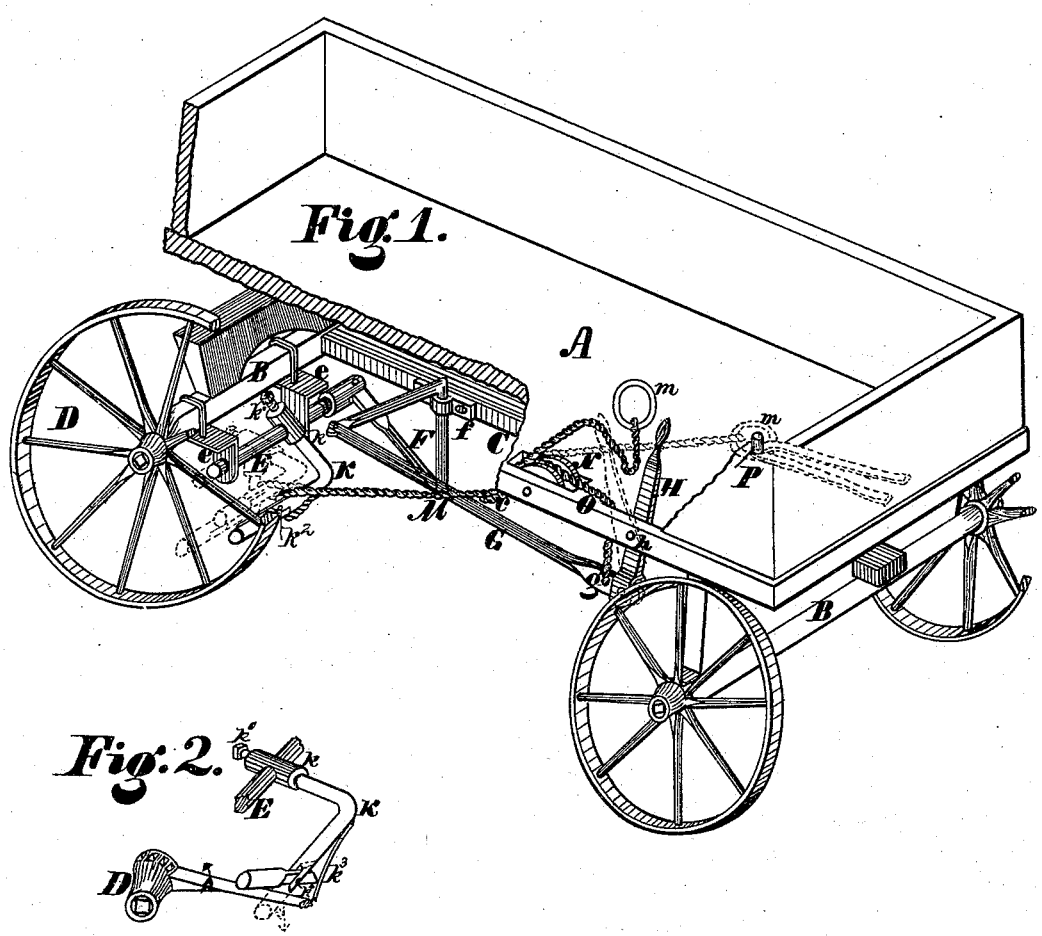

UNITED STATES PATENT OFFICE.

JAMES KNIGHT, OF PHILADELPHIA, PENNSYLVANIA, ASSIGNOR OF ONE-HALF HIS RIGHT TO GEORGE MILLER, OF SAME PLACE.

IMPROVEMENT IN VEHICLE DEVICES FOR CHECKING HORSES.

Specification forming part of Letters Patent No. 170,091, dated November 16, 1875; application filed October 1, 1875.

*To all whom it may concern:*

Be it known that I, JAMES KNIGHT, of Philadelphia, in the county of Philadelphia and State of Pennsylvania, have invented certain new and useful Improvements in Hitching Apparatus; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of my invention. Fig. 2 is a detail perspective.

The nature of my invention consists in the peculiar combination of devices by which a horse may be hitched to a vehicle in such manner that if he attempt to start the lines will be drawn back to check him, provision, at the same time, being made for the avoidance of injury from the horse's backing on being checked.

In the accompanying drawing, A designates the body of a vehicle; B B', the axles; C, the reach connecting the same, and D one of the hind wheels. E designates a short shaft, fitting in brackets or clips $e\,e$, secured to the axle B, and caused to slide longitudinally therein by means of the double crank-arm F, (fastened to the reach C by a half-box, $f$,) arm G, and lever H, pivoted at $h$. K is an L-shaped arm secured to a box, $k$, rendered adjustable on the shaft E by means of a set-screw, $k^1$. By means of these several connections the outer extremity of the arm K, which is jointed at $k^2$, may be projected between the spokes of the wheel D by a rearward motion of the lever H, and withdrawn from between said spokes by a reverse movement of said lever. M shows a strap, chain, or other flexible connection proceeding from the shaft K over a pulley, N, to the front of the vehicle, where it terminates in a ring, $m$. O represents another strap, attached to M at the point $o$, and to the arm G at $g$.

The operation is as follows: When the vehicle is moving the lever H is thrown forward, and the ring $m$ is hung upon a pin or hook, P. When the vehicle stops, and the driver desires to hitch the horse, he throws back the lever H, thus bringing the jointed extremity of the arm K between the spokes of the wheel D. He then removes the ring $m$ from the hook P, and secures the reins to said ring. Now, if the horse should start forward, the spokes of the wheel D, moving downwardly, will depress the arm K, (the shaft E turning therewith,) and cause the reins to be drawn back through the medium of the strap M, thus checking the horse. Now, should the horse begin backing upon being thus checked, no injury (such as ordinarily will occur when the reins are tied to a spoke) will occur, for the jointed extremity of the arm K, which is rigid under the forward motion of the wheel D, will yield upwardly, and prevent the lines from being drawn upon.

Should the driver, upon regaining the vehicle, fail to throw forward the lever H, so as to withdraw the outward extremity of the arm K from between the spokes of the wheel D, said lever will be thrown back automatically, and the arm K duly withdrawn, by means of the strap O, which is drawn upon, so as to act in the desired manner, as soon as the wheel D, carrying with it said arm K, has described about a quarter-revolution.

$k^3$ represents a spring for straightening out the jointed extremity of the arm K after the same has been thrown up in backing.

I claim—

1. In combination with the jointed arm K, the sliding shaft E, double crank-arm F, arm G, and pivoted lever H, substantially as shown and described.

2. In combination with the jointed arm K, attached to the sliding shaft E, the strap or flexible connection M, substantially as shown and described.

3. In combination with the arm K and pivoted lever H, the strap or connection O, for automatically throwing back said lever and withdrawing said arm, as shown and set forth.

In testimony that I claim the foregoing I have hereunto set my hand this 21st day of September, 1875.

JAMES KNIGHT.

Witnesses:
M. DANL. CONNOLLY,
CHAS. F. VAN HORN.